United States Patent [19]

Holt

[11] 4,139,869
[45] Feb. 13, 1979

[54] HIGH-RESOLUTION INFORMATION STORAGE AND RETRIEVAL SYSTEM INCLUDING ELECTRONIC REFRESH BUFFER

[75] Inventor: Arthur W. Holt, Annapolis, Md.

[73] Assignee: Videofax Communications Corporation, Washington, D.C.

[21] Appl. No.: 871,084

[22] Filed: Jan. 19, 1978

Related U.S. Application Data

[63] Continuation-in-part of Ser. No. 742,171, Nov. 16, 1976, Pat. No. 4,090,224.

[51] Int. Cl.² .................................................. H04N 1/36
[52] U.S. Cl. ....................................... 360/35; 360/72
[58] Field of Search .......................... 360/35, 72, 9–10, 360/101; 340/173 DR

[56] References Cited

U.S. PATENT DOCUMENTS

| | | | |
|---|---|---|---|
| 3,095,473 | 6/1963 | Roizen | 360/10 |
| 3,514,537 | 3/1970 | Uemura | 360/72 |
| 3,573,356 | 4/1971 | Toce | 360/9 |
| 3,594,729 | 7/1971 | Uemura | 360/72 |
| 3,715,481 | 2/1973 | Harr | 360/35 |
| 3,761,711 | 9/1973 | Nakamura | 360/35 |
| 3,803,352 | 4/1974 | Goldberger | 360/9 |
| 3,934,268 | 1/1976 | Uemura | 360/72 |

*Primary Examiner*—John H. Wolff
*Attorney, Agent, or Firm*—Michael Ebert

[57] ABSTRACT

A high-resolution video filling system making use of a standard low-resolution magnetic tape video recorder for the storage and retrieval of documentary information. In the storage mode, each document to be filed is scanned by a high-resolution video camera to produce a video signal representing a single image frame having a predetermined number of scan lines that is a multiple of the number of scan lines in a standard low-resolution image frame. The image frame signal from the video camera is divided into a series of fields each having a like number of scan lines, the fields being sequentially applied to the recorder to produce on the moving tape thereof a set of parallel transverse tracks one for each field, the set representing a single image frame. In the retrieval mode, the set of tracks representing a selected document is played back by the recorder and written into an electronic refresh buffer whose contents are then repeatedly read out into a high-resolution monitor at a rate producing a flicker-free image of the selected document.

8 Claims, 8 Drawing Figures

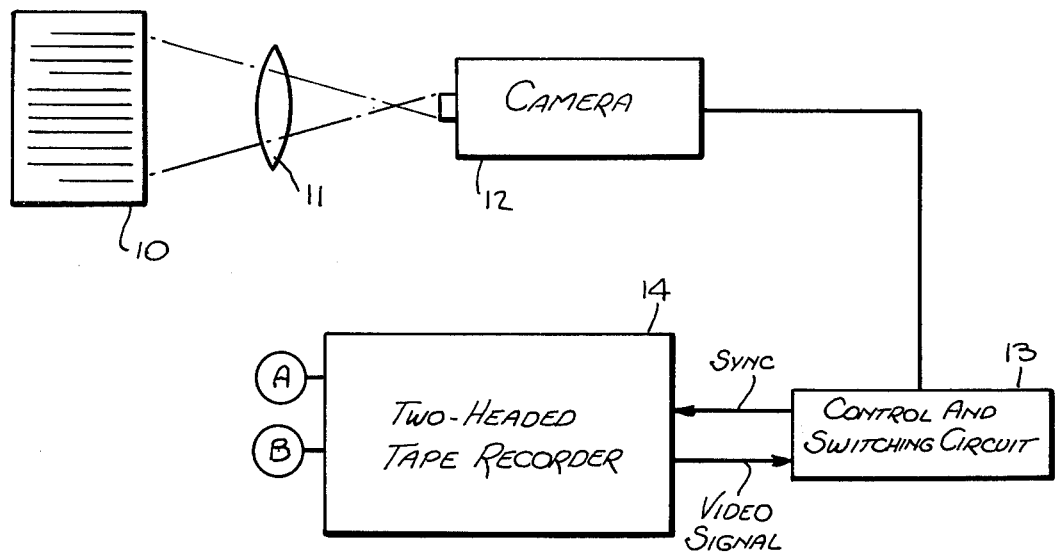
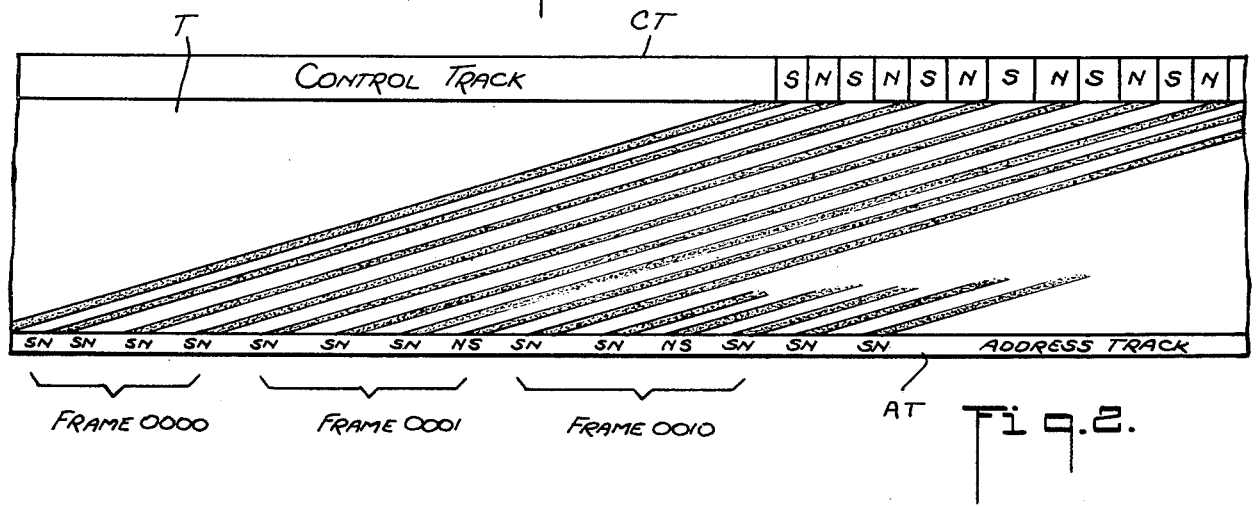
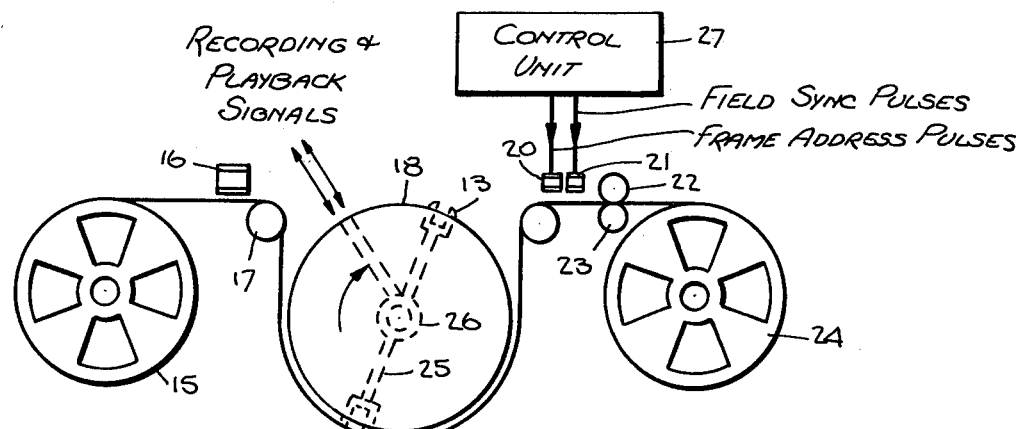

HIGH-RESOLUTION INFORMATION STORAGE AND RETRIEVAL SYSTEM INCLUDING ELECTRONIC REFRESH BUFFER

RELATED APPLICATION

This application is a continuation-in-part of my co-pending application Ser. No. 742,171, filed Nov. 16, 1976 now U.S. Pat. No. 4,090,224, entitled "Video System for Storing and Retrieving Documentary Information."

BACKGROUND OF INVENTION

This invention relates generally to video systems for the storage and retrieval of documentary information, and more particularly to a high resolution information storage and retrieval system which makes use of a conventional low-resolution video tape recorder in conjunction with an electronic refresh buffer.

Video filing systems are known (see U.S. Pat. Nos. 3,594,729 and 3,514,537) which are adapted to record and store documentary information whereby a large body of information may be concentrated in a compact bank from which it can readily be retrieved on demand. In one such video filing system, paper documents are converted by a high-resolution video camera into corresponding high-resolution video image signals. These signals, together with identifying addresses, are automatically filed and stored on magnetic tape reels.

In such known forms of video filing system, any individual document page can automatically be retrieved, looked at in its original size, purged, reorganized with other images or shifted to various locations. An image of a recalled document is presented for viewing on a high-resolution television screen from which it can be reproduced as a hard copy. Since the document images are electronic in nature, filing and retrieval can be carried out remotely from a central file.

The crucial cost factor in a video filing system of this type lies in its means to store the documents as compact video images on magnetic tape which, when played back, are as readable as the original documents. The fact that commercial television systems afford clear images does not mean that such systems are suitable for document storage and retrieval. There is a vast difference between being able to read on a T-V screen an 8-½ × 11 inch document having more than a thousand characters printed on the page, and being able to see on the screen a picture of a house; for in the latter instance, gross detail is sufficient to give one a clear impression of a house, whereas in the former, small printed characters cannot be deciphered.

Thus a video filing system must employ high-resolution video means for recording and displaying documents. An electronic image of a document is created by scanning an optical image of the document focused on the photo-sensitive surface of the video camera tube. Scanning is effected by sweeping an electron beam across the sensitive surface, each sweep being a scan line. By the time the bean has sequentially scanned across the entire picture area from top to bottom, it has created an electronic image of the original document to complete an image frame.

The number of scan lines in an image frame determines one dimension of its resolution or readability. Resolution is a measure of how readable a document is when retrieved from the video picture. Commercial television in the United States has an established standard of 525 scan lines per frame. The resultant resolution is altogether inadequate for normal printed matter. Hence is one known video filing system, use is made of a high-resolution camera and a display tube having 1,280 scan lines in each frame. The other dimension involved in resolution is normally determined by the upper frequency limit of the system.

With a conventional high-resolution video filing system, the magnetic tape storage components and all other functioning elements of the system are designed to operate with the high-resolution scan line number. As a consequence of this requirement, use cannot be made of commercially-available video recording components designed to operate with the standard 525 scan line number per frame.

Another drawback of the known system which discourages its adoption is that when video signals from the storage bank are to be transmitted over common video carrier lines to a remote user terminal, one cannot use standard T-V transmission facilities for this purpose, for such facilities are incapable of conveying the frequencies of a high-resolution video signal. For example, even if a common video carrier line is capable of carrying a 7 megacycle high-resolution video signal as well as the standard 4 megacycle video signal, the associated synchronization system which is designed of the existing standard will not function with the high resolution signal. Hence, special carrier lines are called for, and this fact adds considerably to installation and operating costs.

The practical consequences of these restrictions are serious and have discouraged the adoption of video filing systems; for while standard components are mass-produced, high-resolution recording equipment is not an off-the-shelf item. High resolution devices must be custom-manufactured and inevitably are far more expensive than standard equipment.

With a view to overcoming the practical limitations of a video filing system of the above-described type, the Goldberger U.S. Pat. No. 3,803,352 discloses a hybrid high-resolution/low-resolution video information storage and retrieval system. The entire disclosure of this patent is incorporated herein by reference. In the Goldberger system, the video camera tube for converting the documents into video signals and the video display tube on whose screen the stored documents are reproduced both function as high-resolution devices with a scan line number per frame that is a predetermined multiple of the standard T-V low resolution number and with a frame repetition rate that is a complementary sub-multiple of the standard rate.

For example, in the Goldberger system, a preferred high-resolution frame line number is 1,575, which is exactly three times the standard 525-line number, in which event the sub-multiple is 10 frames per second, which is exactly one-third the standard frame repetition rate of 30 frames per second. Thus if the standard scan line number is multiplexed by three, the frame rate is divided by the same factor.

The video signals generated by the high-resolution camera in the Goldberger system are stored in a standard low-resolution magnetic tape recorder functioning as a storage device. In order to reconcile this low-resolution apparatus with the high-resolution camera and with a high-resolution display tube, means are provided that function to divide the video signals representing a single image frame into distinct signal fields, each having a scan line number equal to the standard line number per frame within a time period equal to the full frame period of the standard frame repetition rate.

For this purpose, Goldberger makes use of a buffer to temporarily record and store a single frame, the buffer being in the form of a disc-type recorder whose operation is controlled by a switching circuit. The buffer is adapted to accept the 1,575 line per frame video signal (10 frames per second) from the camera and to divide this signal equally among three parallel continuous tracks on the disc recorder, whereby the first 525 lines of the full frame, which appear during a one-thirtieth of a second interval, go to the first continuous track, the second 525 lines, which appear in the next one-thirtieth of a second, go to the second continuous track, and the final 525 lines of the same frame, which appear in the last one-thirtieth of a second, go to the third continuous track. Thus the high-resolution video signal is divided into six equal signal fields, each of which has the standard scan line number and frame repetition ratio. However, each field represents only one-sixth of the total high-resolution frame.

In playback, the buffer disc acts as a "refresh memory" and is continuously rotated to repeat the image frames to provide a stationary image on the T-V screen for as long as the user requires the image. With a low-resolution disc recorder in which the course of a full disc revolution taking place in one-thirtieth of a second, a recording of a single high-resolution frame from the video camera takes place sequentially on three tracks in the course of three revolutions. Thus, a full high-resolution frame composed of three signal fields is recorded in one-tenth of a second.

If one were to play back any one continuous track on the disc on a standard T-V display tube, one would see only a third of the original document, which would appear at the standard 525 line —30-frame-per-second rate. In order, therefore, to reconstruct the document, all three tracks must be played back in sequence.

The buffer disc recorder is provided with a unitary assembly of three recording heads, each associated with one of the three tracks in a disc having a large number of concentric tracks. The switching circuit, which is controlled by the T-V camera, acts to render the first head operative for the first signal section of 525 lines, the second head being rendered operative for the next 525 lines and the third head for the final 525 lines.

Thus the three continuous tracks on the buffer disc are recorded in sequence. When another document is to be recorded, the tri-head assembly is automatically mechanically indexed to the next set of three tracks on the disc. As the buffer disc serves only for temporary storage, means are provided to erase the recordings after the buffer has performed its required function. Since a document frame appears in a set of three continuous tracks on the buffer disc, it may be transferred to the magnetic tape recorder which is in the standard format.

Hence in the Goldberger system, in order to store the high-resolution video signals produced by the high-resolution camera, the signals must be recorded temporarily on the separate track of a rotating buffer disc and then transferred from the buffer disc to magnetic tape for permanent storage therein, whereas in the playback mode, the fields recorded on the magnetic tape must be returned to the disc and from there fed to the high-resolution display tube.

Goldberger's use of a mechanical video disc buffer to temporarily store the output of the video recorder functions as a "refresh memory" for the high resolution display tube and requires exact mechanical synchronization between two mechanical systems; that is, between the video tape recorder and the rotating disc buffer. To attain exact synchronization between two such mechanical systems is difficult, particularly with respect to the phase relationship even if the mechanical velocities are matched. Furthermore, a relatively long period of time is necessarily entailed to acquire synchronization, this time being "wasted" in the sense that use of the same period for any other useful purpose is precluded.

Another drawback arising from the use of a mechanical video disc buffer is that, as a practical matter, one cannot switch from one speed to another, in that the inertia of the large diameter disc resists sudden changes in velocity. Since in order to reduce flicker of the screen image it is often desirable to operate the cathode ray tube monitor at rates faster than that at which the picture is delivered to the mechanical video disc buffer, this adversely affects the performance of an information retrieval system of the Goldberger type; for the persistence of the usual screen is insufficient to avoid flicker at slow "refresh" rates.

In my copending application, above-identified, there is disclosed an improvement over a Goldberger-type video filing system, in which improved system each document to be filed is scanned in the storage mode by a high-resolution video camera to produce a video signal representing a single image frame having a predetermined number of scan lines. The frame signal is electronically divided into a series of fields which are successively applied to the recording heads of a four-headed magnetic tape recorder whose heads are vertically offset with respect to each other.

The heads are mounted on a rotating arm and are caused thereby to sweep across a stationary magnetic tape to transversely record the series of fields thereon in parallel tracks, the set of tracks representing the image frame. The tape is indexed to store each document in a distinct set of tracks. Also recorded on the tape along longitudinal tracks are position control data for accurate positioning of the tape and address to facilitate retrieval of the recorded information.

In the retrieval mode, the tape is advanced to present to the heads a desired track set, and the heads are then rotated to continuously yield a series of fields which are applied in the proper sequence to a high-resolution video display monitor to repeatedly reconstitute the image frame and thereby recreate the document selected from the magnetic tape file.

As pointed out in this application--whose entire disclosure is incorporated herein by reference--this four-headed assembly obviates the need for a separate refresh memory which would be required when using a standard video tape recorder. However, the application notes the advantages to be gained by using an electronic refresh memory such as a charge-coupled device having about a million bits of solid-state memory; for then, instead of a frame repetition rate of 15 per second which produces a flicker, one can play back the four-field frame from the tape into the memory during a period of 1/15th of a second, and operate the refresh memory to present this image to the cathode ray display monitor at the normal standard rate of 30 frames per second. On a cathode-ray tube having standard phosphors, this rate would provide a flicker-free image. Moreover, a purely electronic buffer has negligible inertia and can be readily synchronized to any rate and phase.

SUMMARY OF INVENTION

In view of the foregoing, the main object of this invention is to provide a high-resolution video filing system employing a standard low-resolution video tape recorder to store and retrieve documentary information, which system does away with the need for a mechanical buffer or for a special four-headed tape recorder.

More particularly, it is an object of this invention to provide a video filing system in which the video tape recorder in the retrieval mode operates in conjunction with an electronic refresh buffer, the image frame selected for retrieval being written into the buffer at a relatively slow rate determined by the limitations of the recorder and being repeatedly read out from the buffer into a video monitor at the same or higher rate to produce a flicker-free display.

Also an object of this invention is to provide a video filing system which makes use of a standard low-resolution tape recorder whose tape is pre-recorded to establish thereon a control track containing synchronizing signals for maintaining tape movement in synchronism with the video camera and other components of the system as well as an address track containing binary bits to locate the image frames recorded on the tape, whereby once the tape is prepared, it may be used and reused for many different video recordings without the need to rewrite these tracks.

Still another object of this invention is to provide a video filing system of the above type which in the storage mode uses a semi-random address technique permitting the tape of the recorder to run continuously in synchronism with a video camera while documents to be filed are sequentially presented to the camera, the image frames representing the documents being non-sequentially recorded on the tape.

A significant feature of a semi-random address technique in accordance with the invention is that while the sequentially-presented documents are not recorded in sequence, the tape addresses at which they are recorded are printed on the original document and stored in a computer memory to facilitate their subsequent retrieval.

Yet another object of this invention is to provide an electronic buffer constituted by charge-coupled devices in integrated-circuit chip form which are multiplexed to afford the bit capacity needed for a high-resolution image display.

Briefly stated, these objects are attained in a video filing system which in the storage mode scans each document to be filed with a high-resolution video camera to produce a video signal representing a single image frame having a predetermined number of scan lines that is a multiple of the standard low-resolution scan line number.

The frame signal is electronically divided into a series of fields, each having a like number of scan lines. These fields are successively applied to the recording heads of a standard low-resolution video tape recorder whose recording heads are mounted on a rotating arm and are caused to sweep across an advancing magnetic tape to transversely record the fields thereon in a set of parallel tracks, each recorded set on the tape representing a distinct image frame.

The tape is pre-recorded to define a control track having synchronizing signals thereon to maintain tape movement in synchronism with the video camera and an address track having binary bits thereon to locate the recorded image frames, each image frame being stored at a distinct address.

In the retrieval mode, the tape is advanced to present the set of tracks representing an image frame at the selected address to the recording heads of the recorder and to thereby sequentially reproduce the tracks, the track signals being written into an electronic buffer. The buffer is then operated to function as a refresh memory to repeatedly read out the track signals in sequence into a high-resolution video monitor at a rate sufficient to produce a flicker-free image.

It is to be noted that in the prior Goldberger system, when the number of fields per frame is doubled, this provides twice the resolution capability. In the present invention, in which an electronic buffer is used, such doubling must be accompanied by doubling the buffer size.

OUTLINE OF DRAWINGS

For a better understanding of the invention as well as other objects and further features thereof, reference is made to the following detailed description to be read in conjunction with the accompanying drawings, wherein:

FIG. 1 is a simplified block diagram showing the arrangement of a high-resolution video filing system as it operates in the storage mode;

FIG. 2 illustrates the tape of the low-resolution video tape recorder included in the system, the tape having pre-recorded control and address tracks thereon;

FIG. 3 illustrates the relationship between the tape recorder and the control unit which supplies signals for producing the pre-recorded tracks;

DESCRIPTION OF INVENTION

Tape Recording and Preparation

Figure 4:
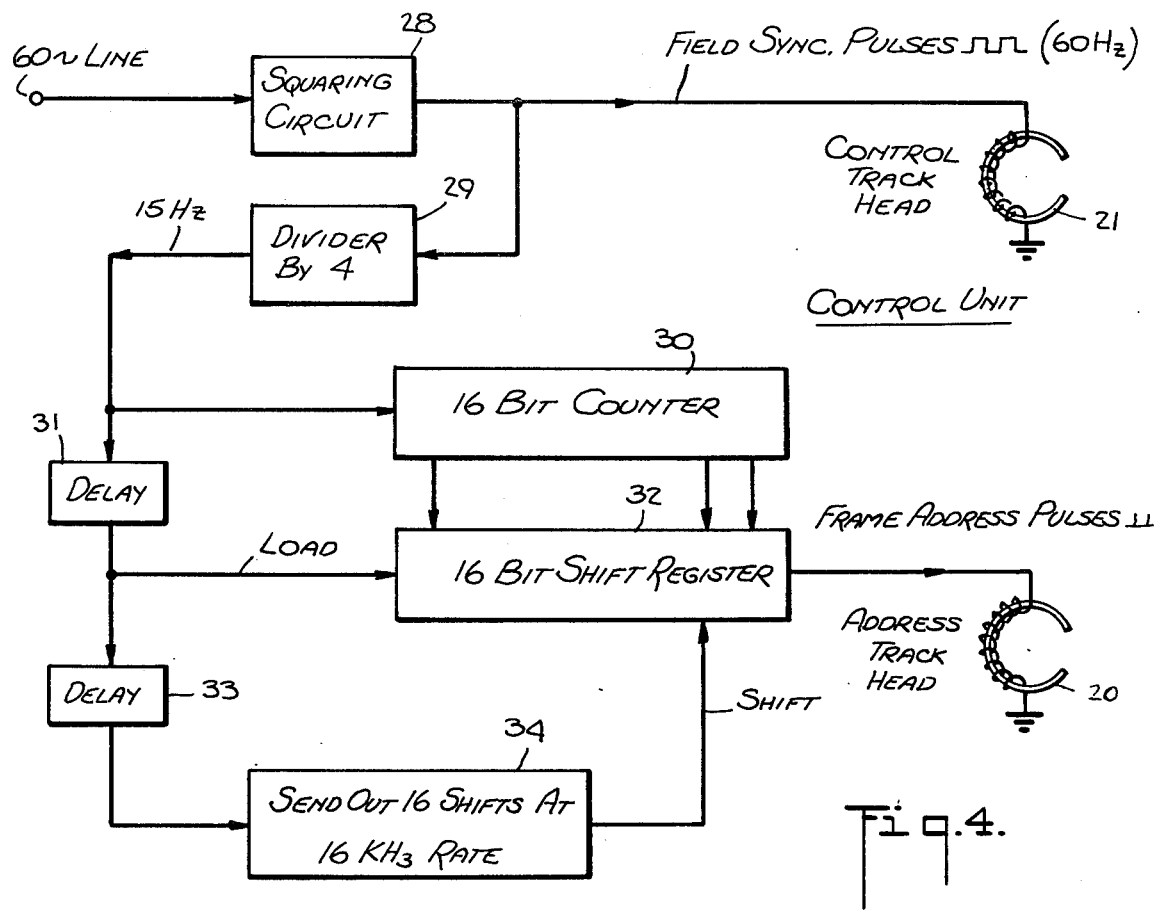
FIG. 4 is a block diagram showing the details of a preferred embodiment of the control unit.

In a video filing system in accordance with the invention, use may be made of a conventional, commercially-available, two-headed magnetic tape video recorder which is capable of recording the full frequency range (4.3 megaHerz) of standard low resolution TV signals. One such recorder is the Panasonic NV 120 as modified by an Electronic Services Corporation 9475-2 kit to extend the frequency response to encompass the full range. Also suitable are the two-headed video tape recorders manufactured by Sony (i.e., AV 3600, AV 3400, AV 3200).

A conventional two-headed magnetic tape video recorder adapted to record and reproduce video signals includes a supply reel, a take-up reel and a cylindrical video head drum located between the supply and take-up reels. A rotor is provided within the drum to turn on an axis colinear with the drum axis, a pair of video heads being mounted on the rotor on opposite sides thereof so that the heads are displaced 180 degrees. The video head drum includes a slot in the vicinity of the heads to enable the heads to scan the tape which is threaded about the drum to define a half helix.

In conventional operation, the tape is advanced at a relatively slow rate along the drum and the rotor is turned at a faster rate, the rates being correlated so that each head is successively in operative relationship to a field of video scan, each head scanning the same track in succession to produce two fields of video.

Referring now to FIG. 1, there is shown in simplified form, the basic components of a high-resolution video system in accordance with the invention for storing documentary information on a conventional two-headed video tape recorder. The retrieval or playback of this information will be considered later.

Information, represented by a printed document 10, is placed on an illuminated platen. An optical image thereof is focused by a suitable lens assembly 11 onto the photosensitive surface of a high-resolution T-V camera tube 12. In the camera tube, an electron beam sweeps across the photosensitive surface to generate a video signal representing the varying brightness of the picture elements constituting the document image.

We shall, for purposes of illustration, provide the necessary high resolution by using a frame line number of 1050 lines per frame, which is two times higher than the standard 525 frame line number. The high-resolution frames have a repetition rate of 15 frames per second, which is one half the standard repetition rate of 30 frames per second, there being four fields per frame.

In the storage mode, when documents are to be recorded, the high-resolution video signal yielded by camera 12 is fed through an electronic switching circuit 13 to the respective heads of a two-head magnetic recorder 10 of the above-described type having a pair of heads A and B which are mounted on one end of a rotating arm. Switching circuit 13 acts effectively to divide the frame signal of 1050 lines into four distinct fields having a like number of lines ($262\frac{1}{2}$), each field being produced within a 1/60th of a second interval. Thus each field is very nearly identical to a field in standard low-resolution television.

Heads A and B are caused by the rotating arm to sweep across a magnetic tape while the tape is being advanced so that the heads traverse two separate tracks on the tape in the course of one arm rotation. Two revolutions are therefore necessary to record the four tracks representing a single image frame on the advancing tape T.

The head positions and switching sequence are such that in the first revolution, head A, to which the first field is applied, sweeps across the advancing tape to record the first track $T_a$ on tape T, as shown in FIG. 2; and when head A departs from the tape, the second head B, to which the second field is applied, then proceeds to record the second track $T_b$ in a position parallel to the first track. This action is repeated in the second revolution to produce tracks $T_c$ and $T_d$ until the four fields are recorded to form a set of four parallel tracks.

In accordance with an important aspect of the present invention, address information is pre-recorded along one edge of the tape on track AT to facilitate the retrieval of the recorded information. A longitudinally-extending control track CT is pre-recorded on the other edge of the tape for accurate positioning of the tape.

Referring now to FIG. 3, there is shown the transport mechanism of a standard two-headed tape recorder as it operates in accordance with the present invention to effect pre-recording of tracks AT and CT. The magnetic tape T to be pre-recorded is wound on a supply reel 15, the tape being typically $\frac{1}{2}$ inch wide and 2000 feet long.

Tape T, when it is drawn from reel 15, first passes by an erase head 16 which functions to remove any previous recording. The tape then turns about an idler 17 from which it is carried around the periphery of a cylindrical drum 18 and about an idler 19. Next in the tape path we find an addressing magnetic head 20 followed by a locator magnetic head 21, the former being used to approximately locate the position of any section of the tape and the latter for precise location of the desired tape signals.

A pair of pinch rollers 22 and 23 acts to pull tape T through the mechanism, the tape then being rewound on a take-up spool 24. Mounted for rotation about a shaft coaxial with drum 18 is the arm 25 of the rotating head assembly. Supported on one end of arm 25 is magnetic recording head A, and on the other end thereof is magnetic recording head B. Electrical connections to these heads are made through concentric slip rings 26. The arm rotates in a horizontal plane extending through a gap in drum 18.

To prepare a tape for recording four fields per frame, field-synchronizing signals are pre-recorded upon control track TC of a fresh or erased tape, and binary address bits are recorded on the address track AT which, in a conventional recording system, serves as the audio track. These pre-recording signals are supplied by a control unit, generally designated by numeral 27. This unit may be a "hard wired" electronic unit or it may be a software or firmware programmed computer.

As shown in FIG. 2, recording on control track CT is carried out at a frequency such that South-North transitions occur at the normal field rate of 60 per second. When played back, this will produce a positive voltage excursion 60 times a second, this sync signal being used to servo-control the tape speed, the rotating head velocity and the rotating head phase in accordance with normal VTR playback synchronization techniques.

The pre-recording on address track AT consists of groups of binary bits. These groups occur every four fields and represent a complete frame member within tape T. FIG. 2 shows three groups of four bits each (0000 - 0001 - 0010). The spacing between groups should, in practice, be much larger than the spacing between bits, but for purposes of simplified illustration, this spacing relationship is not shown in FIG. 2. If a given tape length can accommodate 50,000 frames, there must be at least 16 bits in each group.

A hard-wired control logic to carry out the function of control circuit 27 is shown in FIG. 4 where field sync pulses are applied to control track head 21 to pre-record on track CT, and frame address pulses are applied to track head 20 to pre-record on address track AT. In this logic, a 60-cycle sinusoidal power line signal is applied to a squaring circuit 28, and these square wave pulses are fed to control track head 21. If the tape is moving at its normal speed, this will produce the desired magnetic pattern.

The 60 Hz square wave pulses are applied to a divider 29 which divides the pulses by 4. The resultant 15 Hz pulses are applied to a 16 bit counter 30 which has been reset to zero at the start of the tape. Counter 30 increases its count by one for each frame period.

The 15 Hz square wave pulse is also applied through delay circuit 31 (10 microsecond delay) to the load input of a 16 bit shift register 32. When this pulse occurs, all 16 bits of counter 32 are loaded in parallel into shift register 32. This load pulse is again delayed by a second delay circuit 33 (10 microseconds) whose output goes to a shift pulse generator 34 which generates 16 shift pulses at a 16 KHz rate.

The shift pulses yielded by pulse generator 34 serially shift out the contents of shift register 32, and the resultant pulse train drives address track head 20, thereby producing the desired sequence of counts on the magnetic head. Once a tape has been pre-recorded in preparation for video recording, the same tape may be re-used without the need for rewriting the control and address tracks.

In this arrangement, the camera operator in the storage mode of this system presents documents to the camera at whatever speed he finds convenient, this being done while the tape of the video tape recorder is running at its normal speed. When each new document is ready to be recorded, the operator signals a counter 36 which supplies a document number to be printed on the ready document, the document numbers being supplied in sequence, as shown in FIG. 5.

For this purpose, counter 36 conveys the document number to a document number and tape-address control device 37. This device is also coupled to tape recorder 14 from which it receives the next vacant frame address. Both the vacant frame address and the document number are printed on the ready document, the address and number at the same time being stored in computer memory 35.

A sync signal from tape recorder 14 which is fed to control circuit 13 for camera 12 is also applied to a write-control device 38. Write-control device 38 generates the exact record time, this device being coupled to tape recorder 14 so as to record on the video track of the first field, an indication of whether the frame is blank or not.

Figure 5:
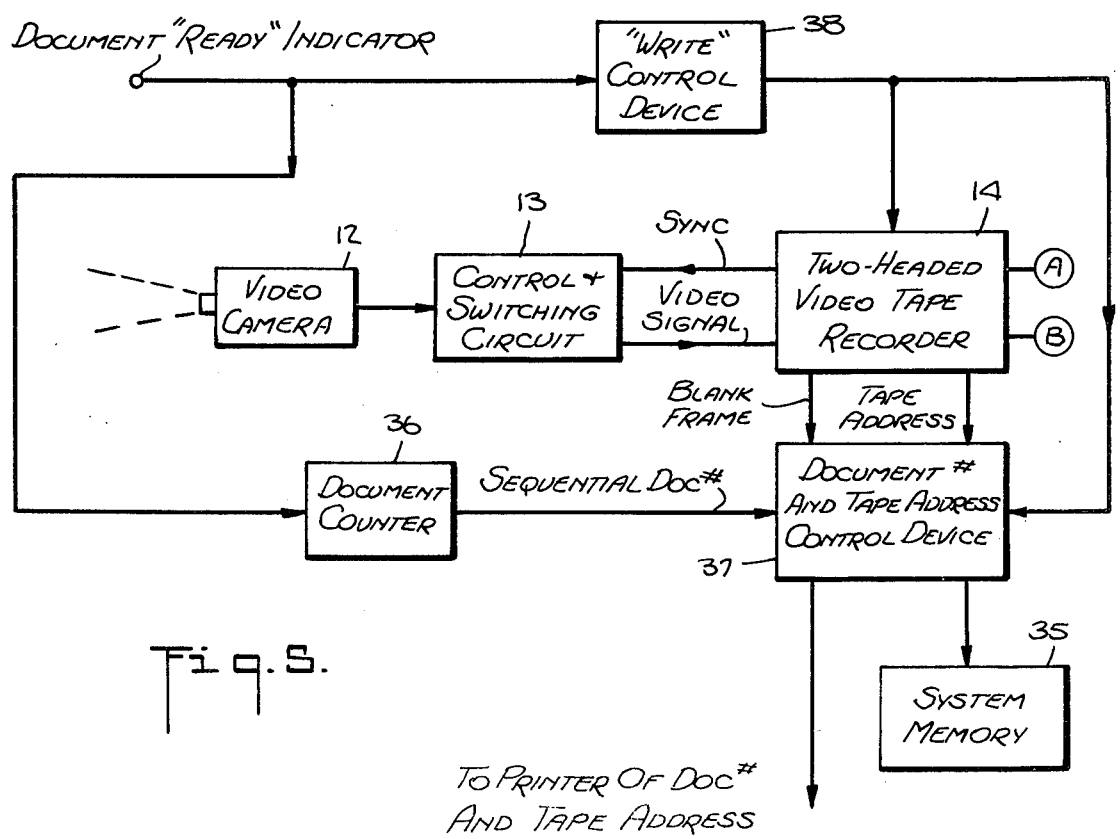
FIG. 5 is a block diagram showing the arrangement for imprinting document numbers and address numbers on the document being recorded.

A system of the type shown in FIG. 5 will initially produce tapes with large gaps, the size of the gaps depending on the interval between the record frame image as determined by the elapsed time between the presentation to the camera of one document for recording and the presentation of the next document. However, during subsequent recording runs, since the system indicates the existence of blanks on the tape, the tape will in time be filled up to fully utilize the available storage capacity of the tape.

Semi-Random Access Recording

In recording documents when using the storage mode arrangement shown in FIG. 1, if the tape of the two-headed video recorder 14 runs continuously in synchronism with camera 10, the documents will be recorded in sequence on the tape at a rate determined by the speed at which the camera operator is able to transfer from one document to the next; or if automatic feeding is employed for this purpose, at the operating rate of the feeder mechanism.

In either situation, a blank interval will exist between the presentation of one document to the camera, and the replacement of this document by the next, which delay will inevitably be reflected on the tape as an unrecorded space between successive sets of field tracks representing the document images.

In order to avoid the need for a mechanical buffer in the storage mode and yet make full utilization of the storage capacity of the tape, one may, in accordance with the invention, present the documents in sequence to the video camera 12 without, however, recording these documents on the tape of recorder 14 at sequential frame addresses. To this end, as shown in FIG. 5, the tape addresses at which the documents are recorded are printed on the original document, which addresses are stored in a computer memory 35.

Alternatively, instead of permitting the tape to run without interruption while the image frames of documents are being recorded at a pace determined by the camera operator, one may arrest tape movement after recording each frame, and then resume tape advance when the next document is ready, without reversing the tape direction. This procedure is essentially useful if the camera operator is very slow.

In practice, when stopping the tape after recording each video frame, the next document is recorded by starting the tape, and after synchronization is re-attained, recording this document in the next vacant space, the tape addresses being stored against true document numbers.

As a compromise between a continuous tape advance and a start-and-stop tape operation for recording each frame image, one may arrange the tape advance mechanism to cause the tape to run for a predetermined "ready" period, say, one of 5 seconds duration; and if a new document is ready for recording in this period, the tape continues to run; otherwise it is halted until the next document is ready for recording.

Retrieval Mode

Figure 6:
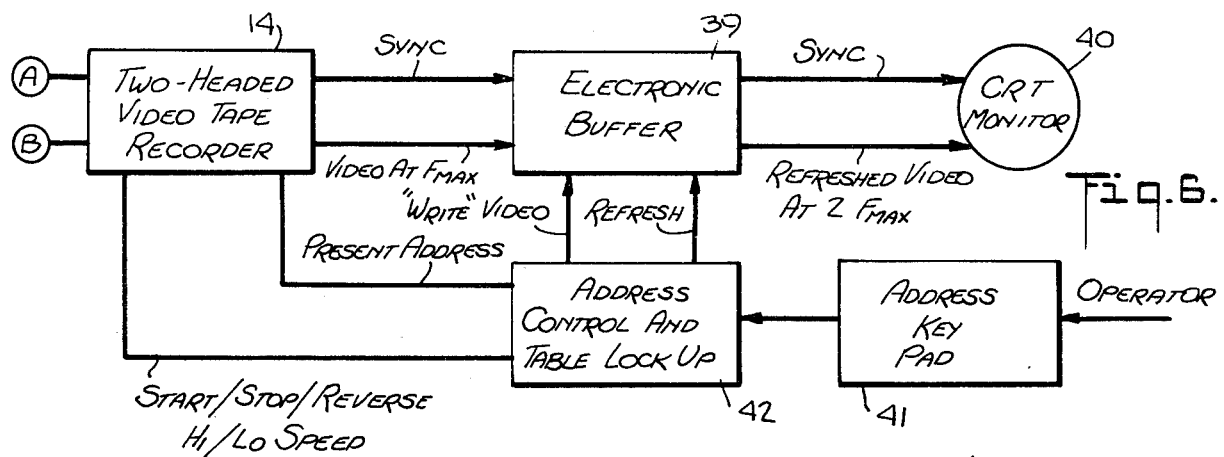
FIG. 6 is a block diagram showing the system arrangement in the document retrieval mode.

Referring now to FIG. 6, there is shown the arrangement in the retrieval mode for playing back an image frame recording representing a selected document to be retrieved from the file. The set of tracks constituting a selected image frame supplied by recorder 14 to an electronic buffer 39 at a rate determined by the tape speed. This electronic buffer then functions as a refresh memory to repeatedly read out the tracks in sequencing and feed them at a higher rate to a high-resolution cathode-ray display tube monitor 40 to produce a flicker-free image of the selected document. Thus buffer 39 acts to catch "on the fly" the output of the two-headed recorder 14 and to refresh monitor 40 at a rate higher than the frame rate at which the recorder is capable of operating.

In the retrieval mode, the operator keys into an address key pad 41 the tape address of the document to be retrieved or the actual document number. In actual practice, it may not be feasible to have the document number match the tape address of the document. In order to reconcile these numbers, a printed index system may be supplied to all operators, the index identifying each document and giving its document number as well as its tape address. Or, in a more sophisticated version of the system, address control 42 coupled to address key pad 41 may incorporate a tape look-up register functioning to convert the document number keyed into key pad 41 into its corresponding tape address.

Address control 42 acts to compare the tape address of the selected document with the address presented on the tape in tape recorder 14. If the desired address is far enough ahead of the presented address to allow the tape to come up to speed, the tape recorder is then instructed to start forward at its normal speed. But if the selected address is more than a certain distance away from the presented address, the recorder is instructed to advance the tape forward at above normal or high speed. When the presented address reaches a point a given number of addresses away from the selected tape address, normal speed operation is reinstated to avoid overshooting the selected address. It is to be noted that addresses can be read at high speed, but not video recordings.

Electronic buffer 39 is maintained in synchronism with video tape recorder 14, and when the selected address is reached, the four fields of the selected image frame are sequentially read into the buffer. The speed at which the fields is written into the buffer from the recorder will typically be $F_{max}$, which is the highest frequency the recorder is capable of reproducing.

Commercially-available, two-headed video recorders for standard low-resolution T-V signals are characterized by an $F_{max}$ that is about 4.3 megaherz. Since in the arrangement disclosed, the frame repetition rate is 15 per second, then even with interlacing of the four fields which constitute a frame, a noticeable flicker will be produced with the usual short persistance phosphor screens found in T-V monitors. To overcome this drawback, the electronic buffer is read out into the monitor at twice $F_{max}$ to provide a flicker-free frame repetition rate of 30 per second.

Electronic Buffers

The electronic buffer may be of the analog or digital type, the latter being preferred. Although semiconductor analog memories are available, such as a bucket-brigade type of charge-coupled device, they tend to degrade after multiple reads. A scan converter tube is another example of a large scale analog electronic storage device, but these tubes are relatively expensive and complicated.

A digital memory suitable as an electronic buffer may be constructed from digital charge-coupled devices such as those manufactured by Intel, Fairchild and other manufacturers. A memory suitable for this purpose is the Intel Corporation IN-65 charge-coupled memory, typically incorporating about a million bits of solid-state memory. Approximately a million bits are needed for a good high-resolution picture. However, this number can be reduced by using data compression techniques.

Where the memory is manufactured in integrated chip form, each chip having, say, 65,000 bits, with an output rate of 4 mHz, these chips may be multiplexed to produce a bit rate of 8.6 mHz for write-in and 15.2 mHz for read-out.

Figure 7:
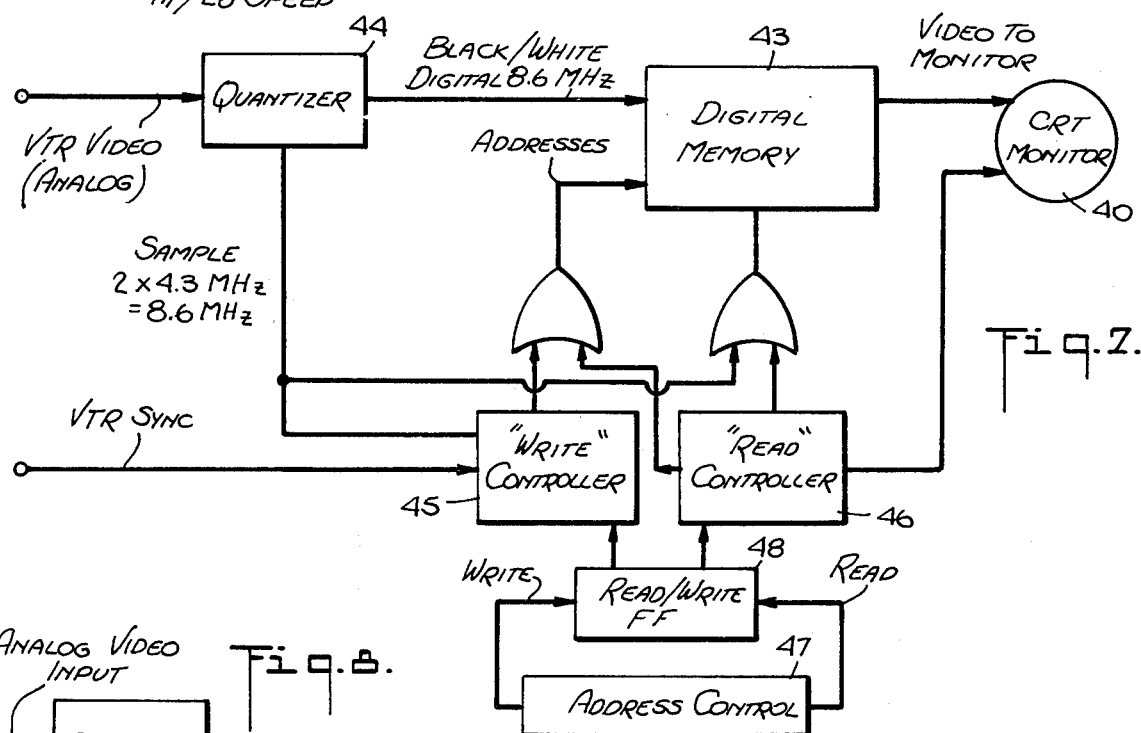
FIG. 7 is a block diagram showing the manner in which the electronic buffer of the digital type is operated in the retrieval mode.

As shown in FIG. 7, when a digital memory 43 is used by an electronic buffer, the video output signals from the video tape recorder which are in analog form must first be quantized by a quantizer 44 before being written into a digital memory 43. Quantizer 44 is supplied with a sampling signal at a rate of 8.6 mHz (twice $F_{max}$) by a "write" controller 45 which is synchronized by sync signals derived from the control tracks of tape recorder 14.

Also associated with memory 44 is a "read" controller 46 which supplies sync signals to the high-resolution monitor 40. Address control 47 generates "write" or "read" signals that are applied to a read/write flip-flop 48. This flip-flop actuates either the "write" controller 45 or the "read" controller 46.

Figure 8:
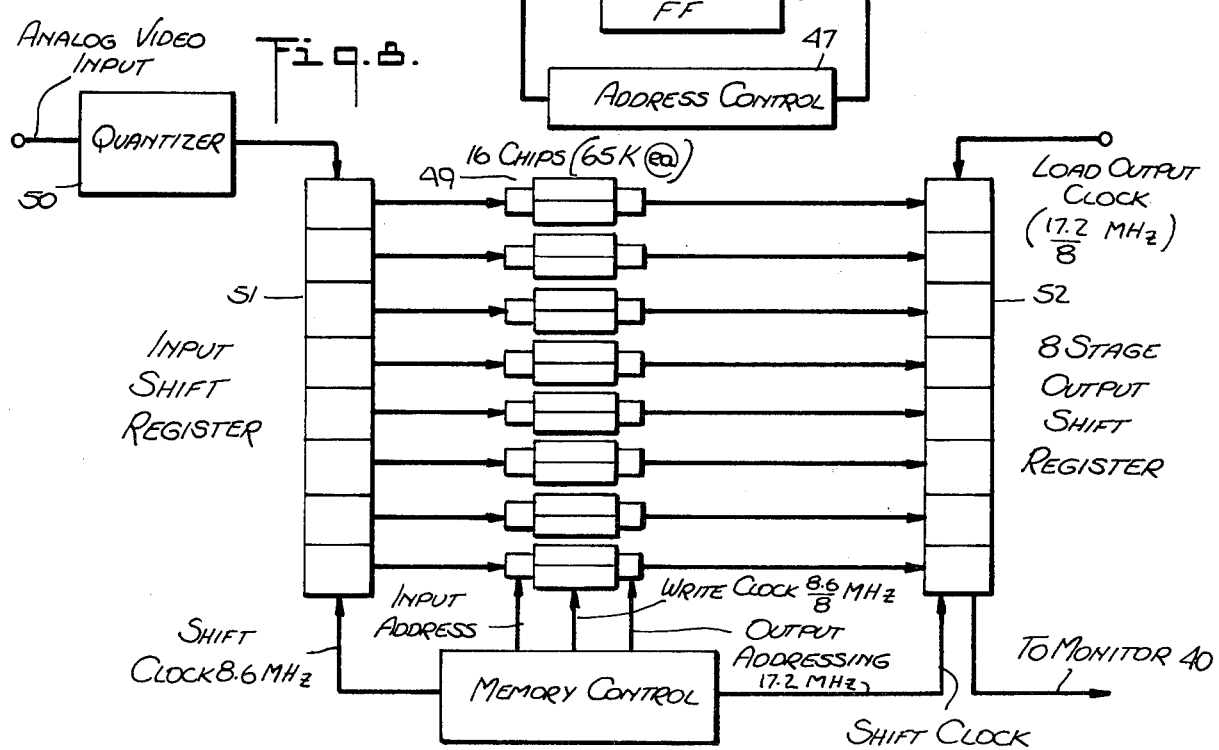
FIG. 8 is a block diagram of a preferred embodiment of an electronic buffer of the digital type.

Referring now to FIG. 8, there is shown the organization of a memory making use of sixteen chips 49, each having a 65,000 bit capacity. The analog video signal to be written into this memory is quantized by quantizer 50, the output of the quantizer being loaded endwise into an eight stage input shift register 51 at 8.6 mHz, from which it is loaded into chips 49 at the same rate. In read-out, the reverse operation takes place by means of an eight stage output shift register 52, all clock speeds being doubled to 17.2 mHz read-out at twice the write-in rate.

In order to provide a simple example and to explain the principles underlying the invention, the number of horizontal scan lines per frame has been given as 1050. This number of scan lines is perfectly feasible. However, the most common method of producing interlaced fields is predicated on having each new field start after a fraction of the preceding line. Thus, a system more compatible with the present day standards would be one having 1049 total scan lines per frame. Dividing 1049 by four equal length fields results in the first field ending at 262 1/4, the second field ending at 524 1/2, the third field ending at 786 3/4, and the fourth field ending at 1049. But if one wishes to use 1050 scan lines, it is merely necessary to develop a small vertical offset voltage which is present during alternate fields.

While there has been shown and described a preferred embodiment of a high-resolution information storage and retrieval system including electronic refresh buffer in accordance with the invention, it will be appreciated that many changes and modifications may be made therein without, however, departing from the essential spirit thereof.

Thus while the system has been shown as including a camera and display tube at the same location, in practice, the display tube and a control terminal for selecting a particular document from the video file may be at a remote location linked to the central file by a conventional coaxial cable for low-resolution video signals. The fields which are transmitted sequentially over this cable correspond to existing T-V standards and may be processed using standard equipment. Moreover, the system lends itself to use as a facsimile transmitter and receiver of mail, the electronic buffer being useful in this context for speed changing.

Also, to effect a saving in storage space, data compression techniques may be used such as run-length encoding facsimile techniques or delta modulation. And instead of using hardwired circuits to carry out all of the necessary control functions, these functions can be performed by a computer that is dedicated to the system.

I claim:

1. A high-resolution video filing system for storing and retrieving documentary information, said system having a storage mode wherein each document to be filed is electro-optically scanned and magnetically recorded and a retrieval mode in which a selected recording is played back and displayed to recreate the document in readable form, said system comprising:
   A. a high-resolution video camera for scanning each document to be filed to produce an analog video signal representing a single image frame having a predetermined number of scan lines in excess of 1000;
   B. a low-resolution magnetic tape video recorder having a rotating head assembly whose heads in the storage mode act to successively sweep across a moving magnetic tape to record thereon, and in the retrieval mode to play back the recording on the moving tape presented to the heads said tape is pre-recorded to provide a control track for synchronizing the operation of said camera with said recorder and an address track for locating the image frame recorded on said tape;

C. a high-resolution video display monitor means capable of recreating a selected document in response to a video signal representing the image frame derived from the selected document;

D. electronic switching means coupled to said camera in the storage mode to divide said video signal representing a single image frame into a series of fields each having the same number of scan lines, and to sequentially feed said fields to the heads of the recorder to record said fields along a like series of parallel transverse tracks to thereby produce a set thereof representing a frame image of said document;

E. an electronic refresh buffer having a memory; and

F. means in the retrieval mode to operate said recorder to play back the set of tracks representing the frame image of the document with selection means for retrieval and to write the resultant track signals into said buffer, the contents of said buffer then being read out repeatedly into said display monitor to display the selected document.

2. A system as set forth in claim 1, wherein said buffer reads out its contents at a relatively high speed to produce a flicker-free display.

3. A system as set forth in claim 1, wherein said electronic buffer is a digital charge-coupled device and further including means to quantize said analog video signals written into the buffer.

4. A system as set forth in claim 1, wherein said recorder is a two-headed recorder in which the heads are mounted on opposite ends of a rotating arm to successively record on the moving tape.

5. A system as set forth in claim 4, wherein said recorder further includes a control track head and an address track head.

6. A system as set forth in claim 4, wherein said control track has square wave pulses recorded thereon derived from a 60-cycle sinusoidal power line.

7. A system as set forth in claim 4, wherein said addresses are in binary form.

8. A system as set forth in claim 4, wherein said image frames are recorded at random address positions on said tape.

* * * * *